US012592241B2

(12) United States Patent
Cho et al.

(10) Patent No.: US 12,592,241 B2
(45) Date of Patent: Mar. 31, 2026

(54) METHOD AND APPARATUS FOR ENCODING AND DECODING AUDIO SIGNAL USING COMPLEX POLAR QUANTIZER

(71) Applicant: Electronics and Telecommunications Research Institute, Daejeon (KR)

(72) Inventors: Byeong Ho Cho, Daejeon (KR); Seung Kwon Beack, Daejeon (KR); Jong Mo Sung, Daejeon (KR); Tae Jin Lee, Daejeon (KR); Woo Taek Lim, Daejeon (KR); In Seon Jang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 178 days.

(21) Appl. No.: 18/502,648

(22) Filed: Nov. 6, 2023

(65) Prior Publication Data

US 2024/0153513 A1 May 9, 2024

(30) Foreign Application Priority Data

Nov. 8, 2022 (KR) ........................ 10-2022-0147557

(51) Int. Cl.
*G10L 19/035* (2013.01)

(52) U.S. Cl.
CPC .................................. *G10L 19/035* (2013.01)

(58) Field of Classification Search
CPC . G10L 19/035; G10L 19/032; G10L 19/0017; G10L 19/0204
See application file for complete search history.

(56) References Cited

U.S. PATENT DOCUMENTS

| | | | |
|---|---|---|---|
| 9,767,815 | B2 | 9/2017 | Liu et al. |
| 10,825,461 | B2 | 11/2020 | Multrus et al. |
| 2022/0415334 | A1* | 12/2022 | Davidson .............. G10L 19/032 |

FOREIGN PATENT DOCUMENTS

| | | |
|---|---|---|
| KR | 10-2022-0108069 | 8/2022 |

OTHER PUBLICATIONS

Ravelli, Emmanuel, and Laurent Daudet. "Embedded polar quantization." IEEE Signal Processing Letters 14.10 (2007): 657-660. (Year: 2007).*

(Continued)

*Primary Examiner* — Anne L Thomas-Homescu
(74) *Attorney, Agent, or Firm* — KILE PARK REED & HOUTTEMAN PLLC

(57) ABSTRACT

A complex number quantization-based audio signal encoding method may comprise: estimating a scale factor for each subband of an input audio signal; performing complex magnitude scaling for each subband based on the scale factor; and performing polar quantization on a complex frequency coefficient for each subband, wherein the performing the polar quantization for each subband comprises applying two or more different magnitude quantization techniques based on the magnitude of the complex frequency coefficient scaled for each subband.

20 Claims, 9 Drawing Sheets

(56) References Cited

OTHER PUBLICATIONS

Pobloth, Harald, Renat Vafin, and W. Bastiaan Kleijn. "Multivariate block polar quantization and an application to audio." 2004 IEEE International Conference on Acoustics, Speech, and Signal Processing. vol. 4. IEEE, 2004. (Year: 2004).*

Pobloth, Harald, Renat Vafin, and W. Bastiaan Kleijn. "Multivariate block polar quantization." IEEE transactions on communications 53.12 (2005): 2043-2053. (Year: 2005).*

Vafin, Renat, and W. Bastiaan Kleijn. "Entropy-constrained polar quantization and its application to audio coding." IEEE transactions on speech and audio processing 13.2 (2005): 220-232. (Year: 2005).*

Jo, Byeongho, Seungkwon Beack, and Taejin Lee. "Modified unrestricted polar quantization with the psychoacoustic parameter for audio coding." Int. Congress. Acoustics. 2022. (Year: 2022).*

Vafin et al. "Entropy-Constrained Polar Quantization and Its Application to Audio Coding", IEEE Transactions on Speech and Audio Processing, vol. 13, No. 2, Mar. 2005, pp. 220-232.

* cited by examiner

| No. | Methods | segSNR (dB) | bitrate (kbps) |
|---|---|---|---|
| (a) | USAC Long TCX (MDCT-based) without noise filling | 10.76 | 13 |
| (b) | Subband-scaling + real/imag Quant. (baseline) | 11.53 | |
| (c) | Subband-scaling + polar Quant. (mode 2) | 7.82 | |
| (d) | Subband-scaling + polar Quant. (mode 1, 2) | 12.65 | |
| (e) | (d) + power of 2 phase Quant. | 12.75 | |

METHOD AND APPARATUS FOR ENCODING AND DECODING AUDIO SIGNAL USING COMPLEX POLAR QUANTIZER

CROSS-REFERENCE TO RELATED APPLICATIONS

This application claims priority to Korean Patent Application No. 10-2022-0147557, filed on Nov. 8, 2022, with the Korean Intellectual Property Office (KIPO), the entire contents of which are hereby incorporated by reference.

BACKGROUND

1. Technical Field

The present disclosure relates to a method for encoding and decoding audio signals and an encoder and decoder executing the method, and more particular to, a technology of quantizing and inversely quantizing the magnitude and phase of frequency domain complex coefficients differently.

2. Related Art

The content presented in this section serves solely as background information for the embodiments and does not represent any conventional technology.

With the advancement of multimedia, efficient encoding technologies for storage and communication on large-capacity media have become increasingly important. Audio coding technology refers to the process of compressing audio signals into a bitstream for transmission and decoding the received bitstream, and numerous techniques have been proposed in this field over the past few decades. The first-generation MPEG (MPEG-1 audio) standard technology was developed based on the Psycho-Acoustic Model (PAM) of human perception to design quantizers in order to minimize perceptual audio quality loss and compress data. Among them, the commercially successful MPEG-1 Layer III (MP3) technology employs a hybrid frequency transformation combining Quadrature Mirror Filter (QMF) and Modified Discrete Cosine Transform (MDCT) to analyze time-domain audio signals in the frequency domain and compresses the analyzed signal using quantization techniques and bit allocation strategies based on psycho-acoustic models. In contrast, subsequently proposed technologies such as MPEG-2/4 Advanced Audio Coding (AAC), High-efficiency AAC (HE-AAC) v1/2, MPEG-D Unified Speech and Audio Coding (USAC) primarily use MDCT for frequency analysis.

SUMMARY

An objective of the present disclosure is to provide an audio coding method based on complex data to overcome the limitations of MDCT-based audio coding technology.

Another objective of the present disclosure is to provide a complex number quantization method capable of efficiently quantize transformed complex coefficients using techniques such as Discrete Fourier Transform (DFT) or Modulated Complex Lapped Transform (MCLT) as an alternative to MDCT.

Another objective of the present disclosure is to provide an audio coding/decoding technique and efficient quantization method to address distortion caused by unintended silent interval shaping or increased noise amplification near attack regions due to time-domain aliasing in conventional techniques using MDCT.

Another objective of the present disclosure is to provide an efficient audio coding/decoding technique derived by combining Unrestricted Polar Quantization (UPQ) for complex variables and psychoacoustic models (PAM) to address the aforementioned issues.

Still Another objective of the present disclosure is to provide a modified polar quantization technique for efficiently quantizing DFT coefficients to address the potential increase in data rate when replacing MDCT with techniques like Discrete Fourier Transform (DFT), resulting in an improved audio coding/decoding technique with enhanced performance.

According to a first exemplary embodiment of the present disclosure, a complex number quantization-based audio signal encoding method may comprise: estimating a scale factor for each subband of an input audio signal; performing complex magnitude scaling for each subband based on the scale factor; and performing polar quantization on a complex frequency coefficient for each subband, wherein the performing the polar quantization for each subband comprises applying two or more different magnitude quantization techniques based on the magnitude of the complex frequency coefficient scaled for each subband.

The performing of the polar quantization for each subband may comprise: determining a magnitude quantization mode by comparing the magnitude of the complex frequency coefficient scaled for each subband with a threshold value; applying a magnitude quantization technique for a first mode based on the magnitude quantization mode being the first mode; and applying a magnitude quantization technique for a second mode based on the magnitude quantization mode being the second mode.

The determining of the magnitude quantization mode may comprise: determining the magnitude quantization mode for each subband by comparing the magnitude of the complex frequency coefficient scaled for each subband with a subband-specific threshold value determined based on a bit constraint configured for each subband.

The performing of the polar quantization for each subband may comprise: applying one of the two or more different magnitude quantization techniques based on the magnitude of the complex frequency coefficient scaled for each subband; and performing phase quantization on the complex frequency coefficient scaled for each subband.

The performing of the polar quantization for each subband may comprise: performing magnitude quantization and phase quantization on the complex frequency coefficient scaled for each subband based on a bit constraint configured for each subband.

The performing of the polar quantization for each subband may comprise: performing phase quantization on the complex frequency coefficient scaled for each subband using intervals of a number corresponding to a power of 2.

The method may further comprise transmitting, after the performing the polar quantization for each subband, a polar quantization index obtained for each subband as input to a lossless coding process.

The method may further comprise: converting, before the performing of the complex magnitude scaling for each subband, the input audio signal into the frequency domain, wherein the converting the input audio signal into the frequency domain may be applied with discrete Fourier transform (DFT) or modulated complex lapped transform (MCLT).

According to a second exemplary embodiment of the present disclosure, a complex number quantization-based audio signal decoding method may comprise: determining one of two or more different magnitude inverse quantization modes by comparing a decoded magnitude quantization index for an audio signal with a threshold value; performing magnitude inverse polar quantization on the magnitude quantization index based on the determined magnitude inverse quantization mode; performing phase inverse polar quantization on a decoded phase quantization index for the audio signal; and generating an inverse polar quantized complex coefficient for the audio signal by combining the magnitude inverse polar quantization result and the phase inverse polar quantization result.

The method may further comprise: inverse-scaling the inverse polar quantized complex coefficient for each subband, wherein the inverse-scaling for each subband may be performed using a subband-specific scaling factor generated during an encoding process.

The method may further comprise: inversely transforming the inverse polar quantized complex coefficient for the audio signal into a time domain audio signal by applying an inverse transformation technique corresponding to a frequency domain transformation technique executed during an encoding process.

The determining of one of the magnitude inverse quantization modes may comprise: determining a first mode applying a scalar inverse quantization technique as the magnitude inverse quantization mode based on the magnitude quantization index being equal to or greater than the threshold value.

The determining of one of the magnitude inverse quantization modes may comprise: determining a second mode for inverse polar quantization of the magnitude quantization index based on a function of a quantization cell size boundary value as the magnitude inverse quantization mode based on the magnitude quantization index being less than the threshold value.

The method may further comprise: generating, before the determining of one of the magnitude inverse quantization mode, the decoded magnitude quantization index and the decoded phase quantization index through lossless decoding.

According to a third exemplary embodiment of the present disclosure, a complex number quantization-based audio signal decoding apparatus may comprise: an inverse polar quantizer performing inverse polar quantization on an audio signal, wherein the inverse polar quantizer determine one of two or more different magnitude inverse quantization modes by comparing a decoded magnitude quantization index for the audio signal, performs magnitude inverse polar quantization on the magnitude quantization index based on the determined magnitude inverse quantization mode, performs phase inverse polar quantization on a decoded phase quantization index for the audio signal, and generates an inverse quantized complex coefficient for the audio signal by combining the magnitude inverse polar quantization result and the phase inverse polar quantization result.

The apparatus may further comprise a subband inverse scaling module performing inverse scaling on the inverse polar quantized complex coefficient for each subband, wherein the subband inverse scaling module may perform inverse scaling on the inverse polar quantized complex coefficient for each subband using a subband-specific scale factor generated during an encoding process.

The apparatus may further comprise an inverse transformer performing inverse transformation of the inverse polar quantized complex coefficient for the audio signal into a time domain audio signal by applying an inverse transformation technique corresponding to a frequency domain transformation technique executed during an encoding process.

The inverse polar quantizer may determine a first mode applying a scalar inverse quantization technique as the magnitude inverse quantization mode based on the magnitude quantization index being equal to or greater than the threshold value.

The inverse polar quantizer may determine a second mode for inverse polar quantization of the magnitude quantization index based on a function of a quantization cell size boundary value as the magnitude inverse quantization mode based on the magnitude quantization index being less than the threshold value.

The apparatus may further comprise a lossless decoder generating the decoded magnitude quantization index and the decoded phase quantization index.

DETAILED DESCRIPTION OF THE EMBODIMENTS

Figure 1:
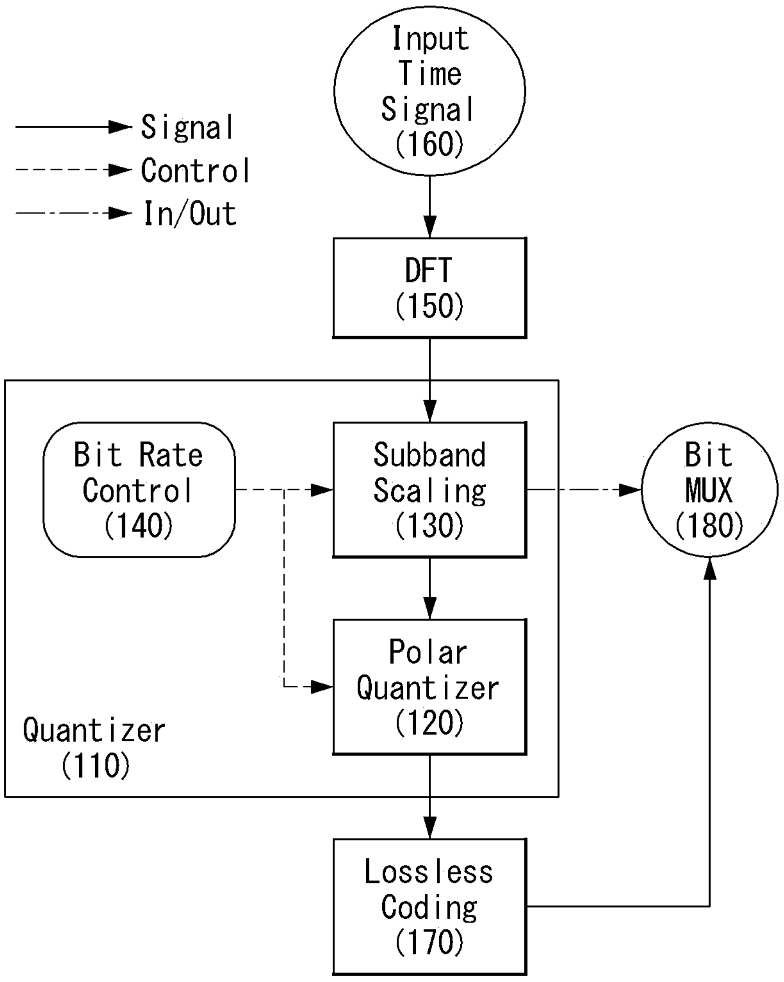
FIG. 1 is a conceptual diagram illustrating an audio signal encoder based on complex number quantization according to an embodiment of the present disclosure.

While the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one A or B" or "at least one of one or more combinations of A and B". In addition, "one or more of A and B" may refer to "one or more of A or B" or "one or more of one or more combinations of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Meanwhile, any technology known prior to the filing date of this application, if deemed necessary, can be included as a part of the configuration of the present disclosure, and such inclusions are explained in this specification within the scope that does not obscure the essence of the present disclosure. However, in explaining the configuration of the present disclosure, detailed descriptions of matters obvious to those skilled in the art as technology known prior to the filing date of this application may be omitted to avoid obscuring the essence of the present disclosure.

For example, technologies involving the use of a psychoacoustic model (PAM) for encoding/decoding audio signals and techniques for transforming audio signals into complex coefficients using methods such as MDCT, DFT, MCLT, and the like may be employed as technologies known prior to the filing of this application, and at least part of these known technologies may be applied as essential elements for implementing the present disclosure.

However, the present disclosure does not intend to claim rights over these known technologies, and the contents of these known technologies may be incorporated as part of the present disclosure within the scope that aligns with the purpose of the present disclosure.

Hereinafter, preferred embodiments of the present disclosure are described with reference to the accompanying drawings in detail. In order to facilitate a comprehensive understanding of the present disclosure, the same reference numerals are used for identical components in the drawings, and redundant explanations for the same components are omitted.

FIG. 1 is a conceptual diagram illustrating an audio signal encoder based on complex number quantization according to an embodiment of the present disclosure.

FIG. 1 may be implemented in the form of an audio signal encoder using dedicated hardware for audio signal processing, or it may correspond to an audio signal encoding method executed by a processor based on at least one executable instruction within a computing system. For example, each of the components in FIG. 1 may be understood by those skilled in the art as corresponding to each step of the audio signal encoding method.

That is, the audio signal encoding method based on complex number quantization according to an embodiment of the present disclosure includes estimating scale factors for subbands for the input audio signal 160 as denoted by reference number 130, performing complex magnitude scaling for each subband based on the scale factors as denoted by reference number 130, and polar-quantizing scaled complex frequency coefficients 310 for each subband as denoted by reference number 120. Here, two or more different magnitude quantization techniques may be applied based on the magnitude of the scaled complex frequency coefficients 310 for each subband in the polar quantization step 120 for each subband.

The quantizer 110 may also include a bit rate controller 140. The scale factors determined by the bit rate controller 140 may be transmitted to control the subband scaler 130 and polar quantizer 120. The output obtained from the subband scaler 130 may be delivered to a bit multiplexer 180 along with the output from the lossless encoder 170.

Figure 2:
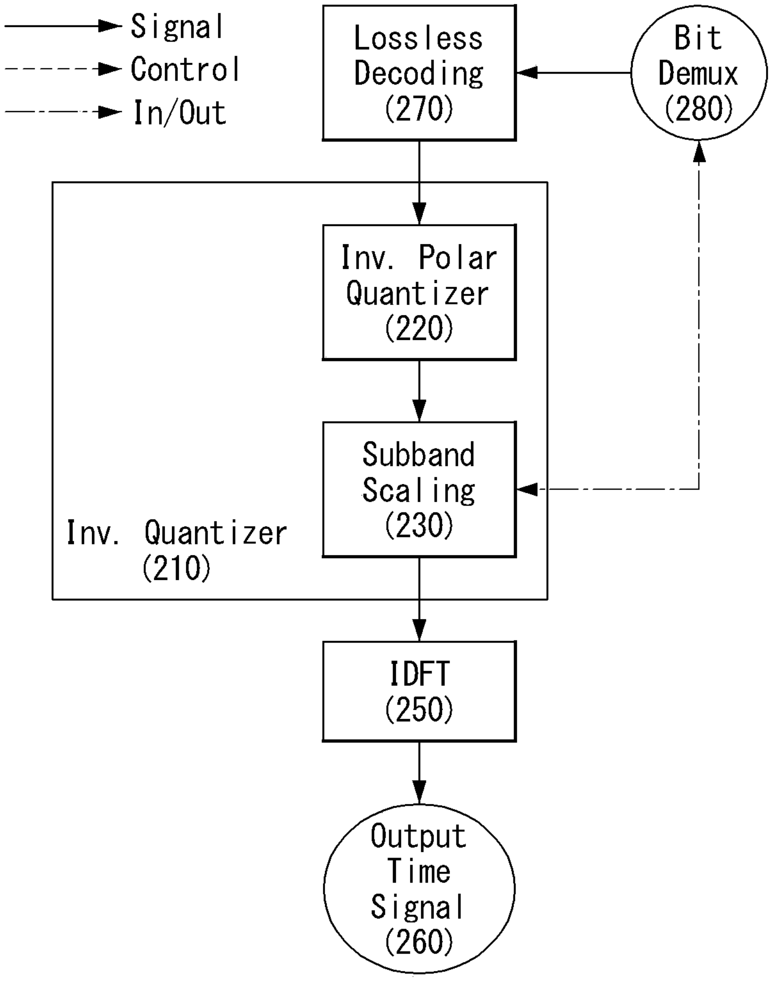
FIG. 2 is a conceptual diagram illustrating an audio signal decoder based on complex number quantization according to an embodiment of the present disclosure.

FIG. 2 is a conceptual diagram illustrating an audio signal decoder based on complex number quantization according to an embodiment of the present disclosure.

FIG. 2 may be implemented in the form of an audio signal decoder utilizing dedicated hardware for audio signal processing, or it may correspond to an audio signal decoding method executed by a processor based on at least one executable instruction within a computing system. For example, each of the components in FIG. 2 may be understood by those skilled in the art as corresponding to each step of the audio signal decoding method.

According to an embodiment of the present disclosure, encoding an audio signal may involves estimating multi-ban scale factors or single scale factors to reduce dynamic band range and information amount of frequency coefficients obtained through DFT, performing complex magnitude scaling with the estimated scale factors, and quantizing as denoted by reference number 110 and inversely quantizing as denoted by reference number 210 the scaled complex frequency coefficients differently for each subband in terms of both magnitude and phase through polar quantization.

In FIG. 2, the decoder may include a lossless decoder 270 corresponding to the lossless encoder 170 in FIG. 1. The quantization index information passed through the lossless decoder 270 may be transmitted to the inverse quantizer 210.

The inverse quantizer 210 may include an inverse polar quantizer 220. The information passed through the inverse polar quantizer 220 may undergo subband-specific scaling at a subband scaler 230.

The output signal from the inverse quantizer 210 may be transformed into the time domain output audio signal 260 through inverse DFT 250.

The bit demultiplexer 280 in FIG. 2 corresponds to the bit multiplexer 180 in FIG. 1, and the bit demultiplexer 280 in FIG. 2 may transmit signals to the lossless decoder 270 and provide information to the subband scaler 230.

The encoder in FIG. 1 may process the audio signal, converting the audio signal into a bitstream, and transmit the bitstream to the decoder.

The decoder in FIG. 2 may reconstruct the audio signal use the received bitstream.

In detail, the encoder in FIG. 1 generates complex coefficients X(f) (f=0, 2, . . . , N/2) through N-size DFT from blocks of the audio signal. Here, users may use MCLT, which is also represented in complex form, instead of DFT for frequency domain analysis. DFT is typically conducted in the form of overlap-and-add.

In detail, the time-domain signal may be divided into predefined segments, and a time-domain window value suitable for DFT analysis may be element-wise multiplied before performing the DFT. Subsequently, during the process of reconstructing the time-domain signal in FIG. 2, the signal may be restored by multiplying the same window and performing an Inverse DFT.

The computed complex coefficients are grouped into predefined uni-frequency or multi-frequency bands, and band-specific scale factors are calculated according to a predefined bit allocation strategy. For example, when dividing the complex coefficients into B subbands, B scale factors S(b) (b=1, 2, . . . , B) may be calculated, and the scale factor Ŝ(b) may be computed as shown in Equation 1 through uniform quantization in dB scale.

$$\hat{S}_{dB}(b)=\max(\min(\lfloor S_{dB}(b)+0.5\rfloor,S_{max}),S_{min}) \quad \text{[Equation 1]}$$

Here, $\lfloor\cdot\rfloor$ represents the floor operation, and Smin and Smax respectively represent the predefined minimum and maximum scale factor values in dB scale, and the subscript dB subscript represents the value after passing through the 20 log 10( ) operation.

Here, only the indices of the quantized scale factors may be transmitted as a bitstream. Using the quantized scale factors Ŝ(b), complex coefficients for each subband may be scaled as shown in Equation 2.

$$\overline{X}_s(f_b)=\frac{|X(f_b)|}{\hat{S}(b)},\ f_b(1)\le f_b\le f_b(N_b),\ b\in\{1,\ \dots\ ,B\} \quad \text{[Equation 2]}$$

In Equation 2, fb represents the frequency index within the bth subband, Nb represents the total number of frequency indices within the bth subband, and || represents the absolute value output operator. The complex coefficients Xs(fb) scaled in magnitude may be calculated by Equation 3.

$$X_s(f_b)=\overline{X}_s(f_b)\exp(j\times\angle X(f_b)) \quad \text{[Equation 3]}$$

Here, exp( ) represents the exponential function, j represents a complex number value defined j2=−1 signifying the imaginary unit, and ∠( ) represents the positive angle formed by a complex number value with respect to the real axis in the complex plane.

Figure 3:
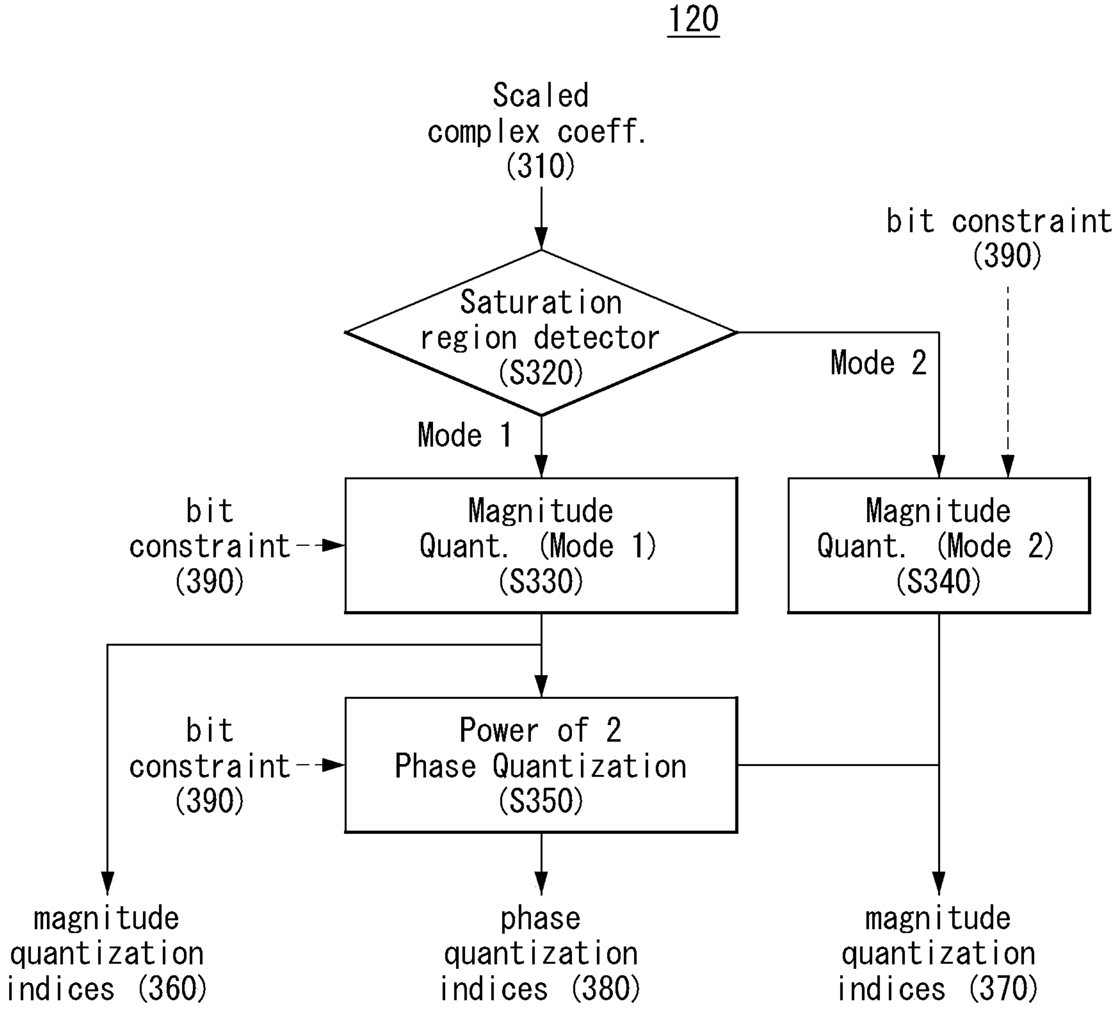
FIG. 3 is a flowchart illustrating the details of a part of FIG. 1 according to an embodiment.

FIG. 3 is a flowchart illustrating the details of a part of FIG. 1 according to an embodiment.

FIG. 3 may be implemented in the form of an audio signal encoder using dedicated hardware for audio signal processing, or it may correspond to an audio signal encoding method executed by a processor based on at least one executable instruction within a computing system. For example, each of the elements in FIG. 3 may correspond to hardware components of the audio signal encoder or be understood by those skilled in the art as corresponding to each step of the audio signal encoding method.

The polar quantizer 120 for subband-specific polar quantization may determine the magnitude quantization mode by comparing the magnitude of scaled complex frequency coefficients 310 for each subband with a threshold at step S320 and apply the magnitude quantization technique for Mode 1 at step S330 based on the magnitude quantization mode being Mode 1 and applying the magnitude quantization technique for Mode 2 at step S340 based on the magnitude quantization mode being Mode 2.

In the magnitude quantization mode determination step S320, the magnitude of scaled complex frequency coefficients 310 for each subband is compared with subband-specific thresholds determined based on the bit constraints set for each subband to determine the magnitude quantization mode for each subband.

The polar quantizer 120 for subband-specific polar quantization may apply one of two or more different magnitude quantization techniques based on the magnitude of scaled complex frequency coefficients for each subband at step S330 or S340 and perform phase quantization for the scaled complex frequency coefficients for each subband at step S350.

The polar quantizer 120 for subband-specific polar quantization may perform magnitude quantization and phase quantization for the scaled complex frequency coefficients for each subband based on the bit constraints 390 set for each subband.

The polar quantizer 120 for subband-specific polar quantization may perform phase quantization for the scaled complex frequency coefficients for each subband using a number of intervals corresponding to powers of 2.

The audio signal encoding method according to an embodiment of the present disclosure may further include transmitting the polar quantization indices obtained for each subband as the input of the lossless encoder 170 after the subband-specific polar quantization at the polar quantizer 120.

The audio signal encoding method according to an embodiment of the present disclosure may further include transforming the input audio signal 160 into the frequency domain signal through DFT 150 before subband-specific complex magnitude scaling by the subband scaler 130. For transformation into the frequency domain, the Discrete Fourier Transform (DFT) or the Modulated Complex Lapped Transform (MCLT) may be applied.

After the signal undergoes the magnitude quantization process for Mode 1 at step S330, the magnitude quantization indices 360 for Mode 1 may be generated.

After the signal undergoes the magnitude quantization process for Mode 2 at step S340, the magnitude quantization indices 370 for Mode 2 may be generated.

After the signal subjected to the magnitude quantization process for Mode 1 or Mode 2 at step S330 or S340 may undergo the phase quantization process at step S350. The phase quantization step S350 may generate phase quantization indices 380.

FIG. 3 illustrates an embodiment of polar quantization using scaled complex coefficients as input.

First, saturation region detection is performed at step S320 to determine whether the magnitude of the scaled complex coefficients 310 for each subband is greater than a predetermined threshold, Tmax. Here, Tmax≤Xs(fb) determines Mode 1, and the magnitude quantizer for Mode 1 may be executed at step S330. The magnitude quantization for Mode 1 may perform, at step S330, magnitude quantization represented by Equation 4 based on the input bit constraint 390. Here, the bit constraint 390 may be defined differently for each band. That is, the threshold Tmax may be set differently for each subband.

In detail, it is possible to apply differential bit constraints 390 to frequency bands based on psychoacoustic models (PAM), and the bit constraints 390 and thresholds may be implemented by allocating more bits to low frequency subbands.

$$M(f_b)=\lfloor |X_s(f_b)|^{3/4}+0.5\rfloor \quad \text{[Equation 4]}$$

Here, M(fb) represents the magnitude quantization indices 360 for Mode 1, which are output by the magnitude quantizer for Mode 1 at step S330 and subsequently passed to the phase quantizer for phase quantization at step S350. The exponent value of ¾ and the value of 0.5 added before the floor operation may be configured differently for each subband and be determined by a function of the target bit rate or by referencing a lookup table depending on the user's intention.

The magnitude quantization for Mode 1 at step S330 may involve scalar quantization (SQ) or non-uniform quantization. According to the embodiment, the magnitude quantization for Mode 1 at step S330 may adopt a general quantization process rather than polar quantization.

When designing the audio encoder/decoder it is necessary to appropriately set Tmax to ensure that the magnitude quantization indices 360 calculated using Equation 4 do not have values overlapping with the quantization indices 370 for Mode 2 as the output of the quantizer for mode 2 at step S304.

When the value ranges of magnitude quantization indices for different modes overlap, it may result in reduced efficiency in terms of information compression, because the mode information of the magnitude quantizer may be required in the magnitude inverse quantization process of the decoder.

According to an embodiment of the present disclosure, when the output values of the magnitude quantizer for Mode 2 at step S340 are set to a range from 1 to 9, the threshold Tmax should be set to a minimum value of 21 to ensure that the output values from the magnitude quantizer for Mode 1 at step S330 are 10 or higher, preventing mutual overlap between different modes and eliminating the need to transmit additional mode information to the decoder.

As a result of the execution of saturation region detection at step S320, Tmax≥Xs(fb) determines Mode 2, and the magnitude quantizer for Mode 2 may be executed at step S340.

The magnitude quantization for Mode 2 at step S340 may be performed using the Unrestricted Polar Quantization (UPQ) technique. According to an embodiment of the present disclosure, the magnitude quantization for Mode 2 at step S340 may be optimized using a more generalized polar quantization technique.

The magnitude quantization for Mode 2 at step S340 may determine the quantization cell size boundary r based on the input bit constraint 390 and calculate magnitude quantization indices for each frequency coefficient (f=0, . . . , N/2) based on the determined size boundary. Here, as the number of bits in the bit constraint 390 increases, the number of elements in the cell size boundary vector r increases, leading to minimization of the mean quantization error. The bit constraint 390 may be input differently for each subband. That is, the vector r may be configured differently for each subband. Suppose that the vector r including the quantization cell size boundaries is determined as Equation 5 according to the bit constraint.

$$r=[0.445,1.188,1.933,2.687,3.455,4.243,5.056] \quad \text{[Equation 5]}$$

Based on the boundaries determined as above, an interval in which the scaled frequency coefficient magnitude falls is found and output as an index 370 and subsequently passed to the phase quantizer for phase quantization at step S350.

For example, when the magnitude of the scaled frequency coefficient 310 is 1, which falls between the first boundary value and the second boundary value in Equation 5, the magnitude quantization index 370 for Mode 2 is 2. When the magnitude of the scaled frequency coefficient is smaller than the first boundary value, the magnitude quantization index is 1.

The magnitude quantization index of 1 means that the scaled frequency coefficient falls within the quantization cell including the origin and that the magnitude through the inverse quantization process of the decoder becomes 0.

The magnitude quantization indices 360 and 370 obtained through the magnitude quantization for Mode 1 at step S330 and the magnitude quantization for Mode 2 at step S340 are transmitted to the lossless encoder 170 of FIG. 1 for phase quantization at step S350. At the phase quantization step S350, the number of quantization cells K for uniform quantization is determined based on the received bit constraint 390 and the magnitude quantization indices 360 and 370. In detail, it is determined whether the magnitude quantization indices 360 and 370 are greater than the number of elements Nr in the quantization cell size boundary vector. When the received magnitude quantization indices are greater than the number of elements Nr in the quantization cell size boundary vector, it is determined that the indices were received in Mode 1, which sets the number of uniform quantization cells K(f) to a predefined Kmax value. According to an embodiment of the present disclosure, the Kmax value may be limited to be a power of 2 for the convenience of implementation and performance optimization. Allocating the number of uniform quantization cells K(f) to a number of intervals of a power of 2 can improve the encoding performance of the audio signal. Furthermore, allocating the number of uniform quantization cells K(f) to a number of intervals of a power of 2 can simplify the hardware implementation for audio signal encoding.

When the received magnitude quantization indices 360 and 370 are less than the number of elements Nr in the quantization cell size boundary vector, it is determined that the indices were received in Mode 2, which causes the K value to be calculated by indexing the number of uniform quantization cells K(f) as the magnitude quantization index 370 for Mode 2 as in Equation 6.

$$K(f_b)=p(M(f_b)) \quad \text{[Equation 6]}$$

Here, the vector p, predetermined by the bit constraint 390, represents a vector containing the number of uniform quantization cells for each magnitude cell. The bit constraint 390 input for phase quantization at step S350 may also be defined differently for each subband. That is, the vector p may be calculated differently for each subband. Each element of the vector p is a power of 2 from the set {2, 4, 8, 16, Kmax} and increases monotonically as the index increases. The size of the vector p is equal to Nr, which represents the number of elements in the quantization cell size boundary vector. An example of the vector p may be represented as shown in Equation 7.

$$p=[1,8,16,16,32,32,64,64] \quad \text{[Equation 7]}$$

In this case, the number of uniform quantizations corresponding to the first quantization cell is fixed to 1. That is, for quantization cells that include the origin in magnitude, phase quantization is not performed separately, and no bits are allocated. This process will be described again with reference to FIG. 5 later. This process corresponds to not performing sign quantization for coefficients whose magnitude becomes 0 after quantization when quantizing real-valued MDCT coefficients in the general quantization process.

The number of uniform quantization cells K(fb) obtained through Equation 6 may be used in Equation 8 to calculate the phase quantization index P(fb) 380.

$$P(f_b) = \left\lceil \frac{\angle X_s(f_b)}{2\pi} \times K(f_b) \right\rceil,\ K(f_b) \neq 1 \quad \text{[Equation 8]}$$

Here, ∠Xs(fb) represents the phase value of the scaled DFT coefficient, which has values ranging from 0 to 2π. When K is 1, no value is assigned to the phase quantization index 380. That is, when K is 1, this means that no bits are allocated for phase, allowing for a reduction in the number of bits required to compress the phase.

In FIG. 3, the magnitude indices 360 and 370 and phase indices 380 from the polar quantizer 120 are calculated in order from lower to higher frequencies, and these indices may be encoded without loss using entropy coding techniques such as Huffman coding or arithmetic coding and then transmitted to the multiplexer 180 in FIG. 1.

Figure 4:
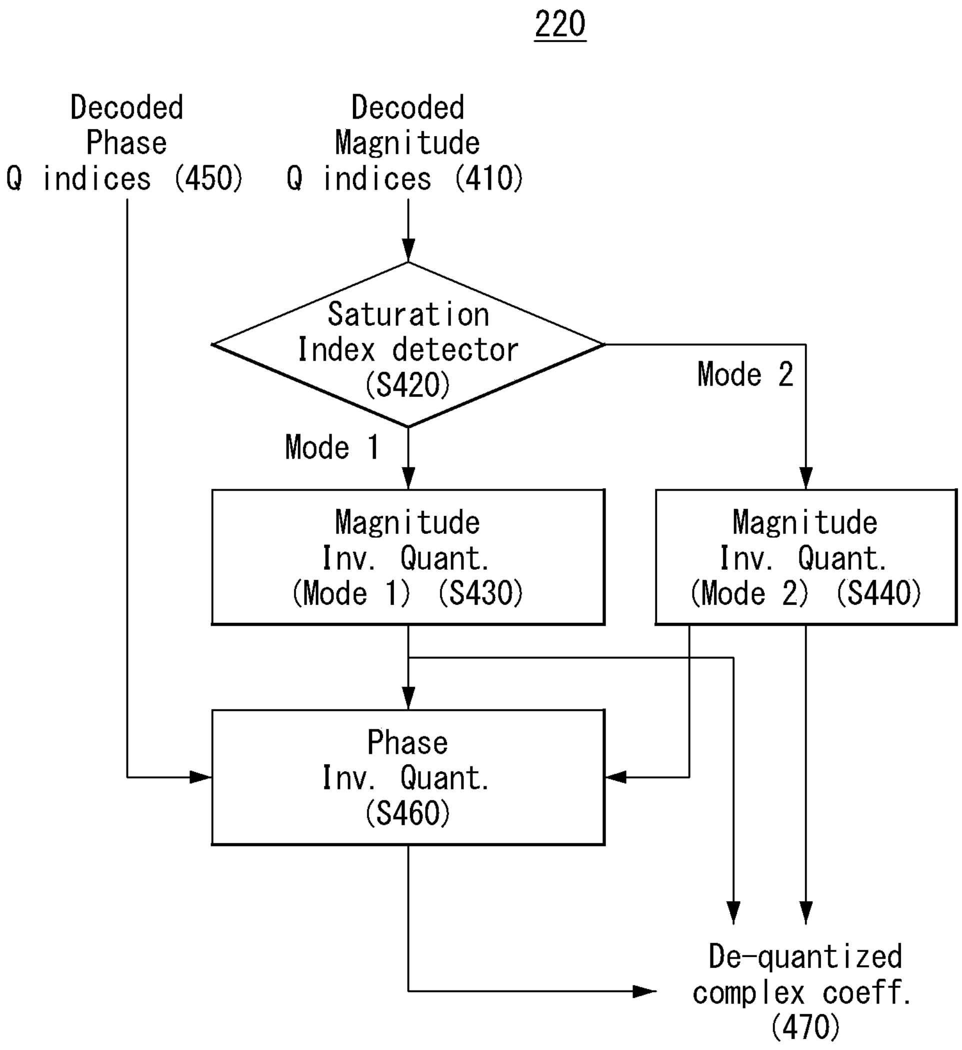
FIG. 4 is a flowchart illustrating the details of a part of FIG. 2 according to an embodiment.

FIG. 4 is a flowchart illustrating the details of a part of FIG. 2 according to an embodiment.

FIG. 4 may be implemented in the form of an audio signal decoder utilizing dedicated hardware for audio signal processing, or it may correspond to an audio signal decoding method executed by a processor based on at least one executable instruction within a computing system. For example, each of the elements in FIG. 4 may correspond to hardware components of the audio signal decoder or be understood by those skilled in the art as corresponding to each step of the audio signal decoding method.

The audio signal decoding method based on complex number quantization according to an embodiment of the present disclosure includes determining one of two or more different magnitude inverse quantization modes at step S420 by comparing the decoded magnitude quantization indices 410 for the audio signal with a threshold, performing magnitude inverse polar quantization at step S430 or S440 on the magnitude quantization indices 410 based on the determined magnitude inverse quantization mode, performing phase inverse polar quantization at step S460 on the decoded phase quantization indices 450 for the audio signal, and generating de-quantized complex coefficients 470 for the audio signal by combining the results of magnitude inverse quantization and phase inverse quantization.

The audio signal decoding method based on complex number quantization according to an embodiment of the present disclosure may further include inversely scaling the de-quantized complex coefficients 470 by the subband scaler 230. The subband scaler 230 may perform subband-specific inverse scaling using the subband-specific scale factors generated during the encoding process.

The audio signal decoding method based on complex number quantization according to an embodiment of the present disclosure may further include inversely transforming the de-quantized (inverse polar quantized) complex coefficients 470 into a time domain audio signal through an inverse transform technique 250 corresponding to the frequency domain transform technique used in the encoding process.

In the magnitude inverse quantization mode determination step S420, when the magnitude quantization index is greater than a threshold, Mode 1 employing scalar inverse quantization technique is determined as the magnitude inverse quantization mode.

In the magnitude inverse quantization mode determination step S420, when the magnitude quantization index is less than the threshold, Mode 2, which involves inverse polar quantization of the magnitude quantization index based on the function of quantization cell size boundaries, may be determined as the magnitude inverse quantization mode.

The audio signal decoding method based on complex number quantization according to an embodiment of the present disclosure may further include, before the magnitude inverse quantization mode determination step S420, generating the decoded magnitude quantization indices 410 and decoded phase quantization indices 450 through lossless decoding.

FIG. 2 is a diagram illustrating the detailed configuration of the decoder. First, the transmitted and received bitstream is decoded through the inverse process of the lossless coding used in the encoder of FIG. 1. The decoded magnitude and phase indices are input into the inverse quantizer 210 in the order from lower to higher frequencies.

FIG. 4 is a flowchart illustrating the detailed operation of the inverse polar quantizer 220 in the decoder. The decoded magnitude indices 410 and phase indices 450 obtained through lossless decoder 270 are input to the polar inverse quantizer 220. The decoded magnitude indices 410 pass through a saturation index detector at step S420 in FIG. 4. When the decoded magnitude indices have values greater than Imax, which corresponds to the predefined threshold Tmax, Mode 1 may be determined as the magnitude inverse quantization mode. When Mode 1 is determined, the decoded magnitude indices 410 may be passed to the magnitude inverse quantizer for Mode 1 at step S430. The decoded magnitude index values 410 are computed in the magnitude inverse quantizer for Mode 1 using Equation 9, at step S430, to be transformed into the restored magnitude.

The restored magnitude may be obtained using Equation 9.

$$\overline{X}_r(f_b)=M(f_b)^{4/3} \quad \text{[Equation 9]}$$

Here, the exponent value 4/3 is defined as the reciprocal of the exponent value in Equation 4 and may be changed according to the user's intention as in Equation 4. The magnitude restored through Equation 9 is also passed to the phase inverse quantizer at step S460 and may be used in the calculation of the de-quantized complex coefficients 470.

The magnitude inverse quantization process for Mode 1 at step S430 may involves inverse scalar quantization (SQ) or inverse non-uniform quantization.

As a result of the comparison by the saturation index detector at step S420, when the decoded magnitude indices have values less than Imax, Mode 2 may be determined as the magnitude inverse quantization mode. When Mode 2 is determined, the decoded magnitude indices 410 may be passed to the magnitude inverse quantizer for Mode 2 at step S440.

The magnitude quantization for Mode 2 at step S440 may be performed using an inverse Unrestricted Polar Quantization (UPQ) technique.

The decoded magnitude indices 410 transmitted to the magnitude inverse quantizer for Mode 2 may be restored to optimal magnitude values. The optimal restored magnitude values may be defined as a function of predefined quantization cell size boundary values. The quantization cell size boundary values may be provided as described earlier in Equation 7. The assumption is that the bit constraint information required to determine these boundaries is stored identically in the memory of both the encoder and decoder. The optimal restored magnitude values obtained from the inverse quantizer for Mode 2 at step S440 may be expressed using Equation 10.

$$a_i = \mathrm{sinc}\left(\frac{1}{p_i}\right)\frac{\int_{r_{i-1}}^{r_i} rg(r)dr}{\int_{r_{i-1}}^{r_i} g(r)dr},\ i \in 1, \ldots, N_r \qquad \text{[Equation 10]}$$

$$a = [a_1, a_2, \ldots, a_{N_r}]$$

Here, Nr represents the number of elements in the size boundary values, and g(r) represents the probability density function of the scaled complex magnitude. Users may estimate this using audio/voice signal databases or opt to use the probability density function of Mode 1 Rayleigh distribution. The probability density function of the Mode 1 Rayleigh distribution may be expressed by Equation 11.

$$g(r) = r \cdot \exp\left(-\frac{r^2}{2}\right) \qquad \text{[Equation 11]}$$

Here, πi represents the predefined number of phase quantization cells for the ith quantization cell.

The restored magnitude values obtained using Equation 10, Equation 11, the boundary vector r, and the vector of uniform quantization cell numbers p may be stored in memory as a vector a and used as needed.

The magnitude of DFT coefficients may be restored as shown in Equation 12 by indexing the decoded magnitude indices 410 into the restored magnitude vector.

$$\overline{X}_r(f_b)=a(M(f_b)) \qquad \text{[Equation 12]}$$

Similar to the 'restored magnitude' obtained from the magnitude inverse quantizer for Mode 1 at step S430, the 'restored magnitude' obtained from the magnitude inverse quantizer for Mode 2 at step S440 is passed to the phase inverse quantizer at step S460 for use in the calculation of the de-quantized complex coefficients 470.

At step S460, the phase inverse quantizer may restore phase values using the decoded phase indices 450 and the magnitude values inversely quantized by the magnitude inverse quantizer for Mode 1 or Mode 2 at step S430 or S440. The restored phase values may be expressed by Equation 13.

$$\angle X_r(f_b) = \begin{cases} \frac{2\pi(2P(f_b)-1)}{K(f_b)}, & K(f_b) \neq 1 \\ \pi, & K(f_b) = 1 \end{cases} \qquad \text{[Equation 13]}$$

Here, K(fb) represents the number of uniform quantization cells for the fbth frequency bin, and it may be calculated by Equation 6.

P(fb) represents the decoded phase index for the fbth frequency bin, and it may have integer values ranging from 1 to K(fb).

The de-quantized complex coefficients 470 may be calculated by Equation 14. To obtain the de-quantized complex coefficients 470, the necessary information includes the inverse quantized magnitude and inverse quantized phase values for Mode 1 or Mode 2. The inverse quantized phase values may be calculated by Equation 13. The inverse quantized magnitude values obtained from the magnitude inverse quantizer for Mode 2 at step S440 may be calculated by Equation 12. The inverse quantized magnitude values obtained from the magnitude inverse quantizer for Mode 1 at step S430 may be calculated, for example, by Equation 9.

$$X_r(f_b)=\hat{X}_r(f_b)\times\exp(j\times\angle X_r(f_b)) \qquad \text{[Equation 14]}$$

Referring back to FIG. 2, the de-quantized complex coefficients 470 may be inversely scaled for each subband by the subband scaler 230 in the inverse quantizer 210. The subband scaler 230 may perform the inverse scaling process using the subband-specific scale factors received from the encoder.

The inverse scaling process performed by the subband scaler 230 with the scale factors may be expressed by Equation 15.

$$X_{rs}(f_b)=X_r(f_b)\cdot\hat{S}(b), f_b(1)\leq f_b\leq f_b(N_b), b\in\{1, \ldots, B\} \qquad \text{[Equation 15]}$$

The inverse scaled complex coefficients Xrs(fb) are multiplied by the window function corresponding to the window function used in the encoder and undergo an inverse Discrete Fourier Transform (IDFT) and sequentially the usual overlap-and-add process to be restored as a time-domain signal.

When the encoder used the MCLT instead of DFT in the transformation process, the corresponding Inverse MCLT may be applied to obtain a fully restored signal.

Figure 5:
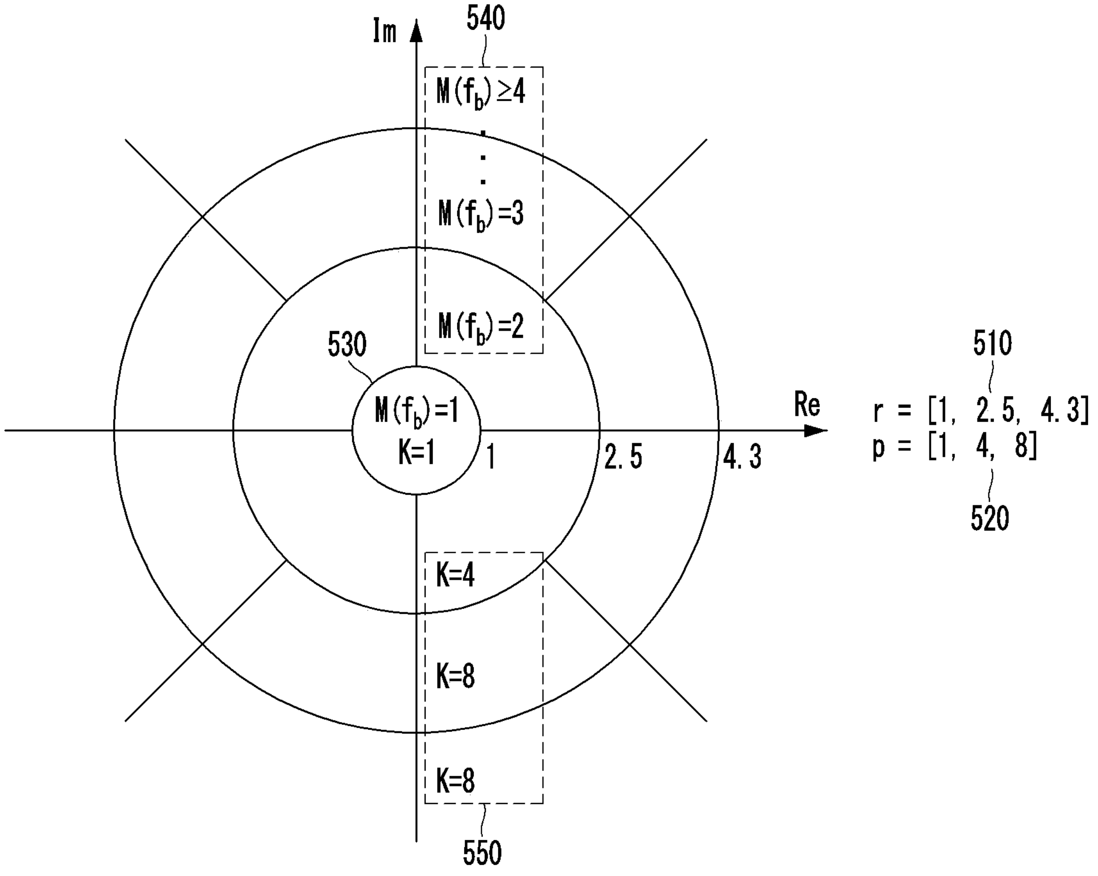
FIG. 5 is a conceptual diagram illustrating the polar quantization process on a complex number plane according to an embodiment of the present disclosure.

FIG. 5 is a conceptual diagram illustrating the polar quantization process on a complex number plane according to an embodiment of the present disclosure.

In FIG. 5, no information about the inverse quantization coefficients is not shown. FIG. 5 involves the case where the number of magnitude quantization cells is greater than or equal to 4 and the number of boundaries of magnitude quantization cells for use in Mode 2 is 3 as denoted by reference number 510.

Hereinafter, a detailed description is made in association with the polar quantization process. First, with respect to the magnitude quantization cell r 510, the quantization cell in which the magnitude value 540 of the complex number falls is determined. For example, when the magnitude of the complex number to be quantized is 1.8, it falls between 1 and 2.5 and belongs to the second cell.

Once the magnitude quantization cell is determined, the number of divisions K 550 for uniformly quantizing the complex number phase is determined based on the magnitude quantization cell, boundaries (gray scale blocks) are defined to evenly divide this range in consideration of the phase ranging from 0 to 2π, and the complex number to be quantized is assigned, based on these boundaries, to a quantization cell and converted into a phase index.

The vector p 520 representing the number of uniform quantization divisions for the magnitude quantization cell r 510 is illustrated.

For example, when the magnitude value is 1.8 and the phase value is (¾)π, and it falls into the second block counterclockwise from the positive real axis among four blocks of the second size cell, and thus is assigned the phase index of 2. When the magnitude value is 4.3 or higher, quantization is performed using the Mode 1 magnitude quantizer (see Equation 4), and in this case, the magnitude index may have a value greater than or equal to 4.

In the case of phase, it is uniformly quantized using the maximum number of divisions Kmax and may be converted into a phase index. In the embodiment of FIG. 5, Kmax is given as 8.

Referring to the magnitude quantization cell r 510, when the magnitude of the coefficient to be quantized is smaller than the minimum magnitude cell boundary "1", the magnitude index is assigned as 1, and since K=1, no bits are allocated for the phase. This scenario is illustrated in the minimum magnitude region 530 of FIG. 5.

Figure 6:
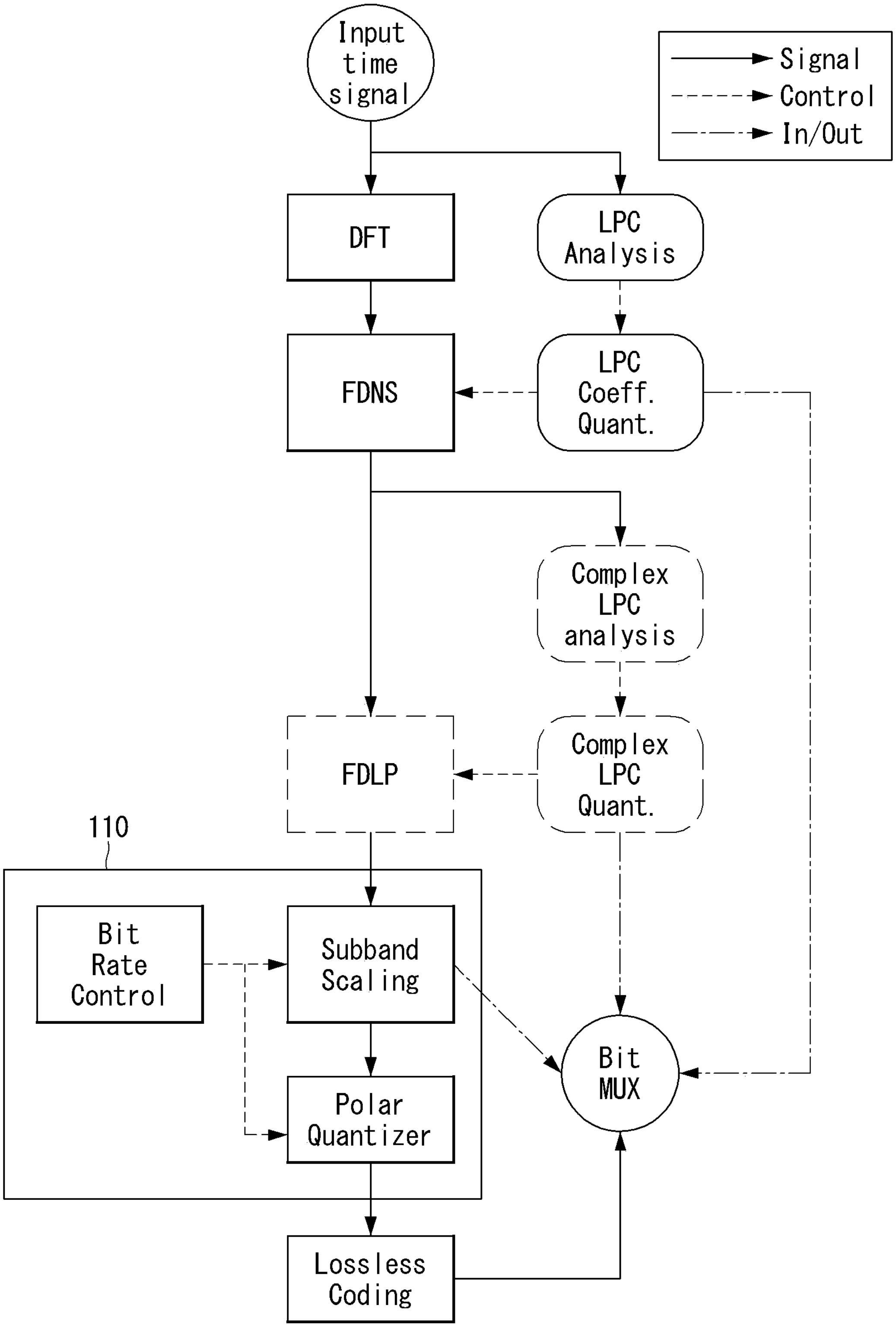
FIG. 6 is a conceptual diagram illustrating an audio signal encoder based on complex number quantization according to an embodiment of the present disclosure.

FIG. 6 is a conceptual diagram illustrating an audio signal encoder based on complex number quantization according to an embodiment of the present disclosure.

Figure 7:
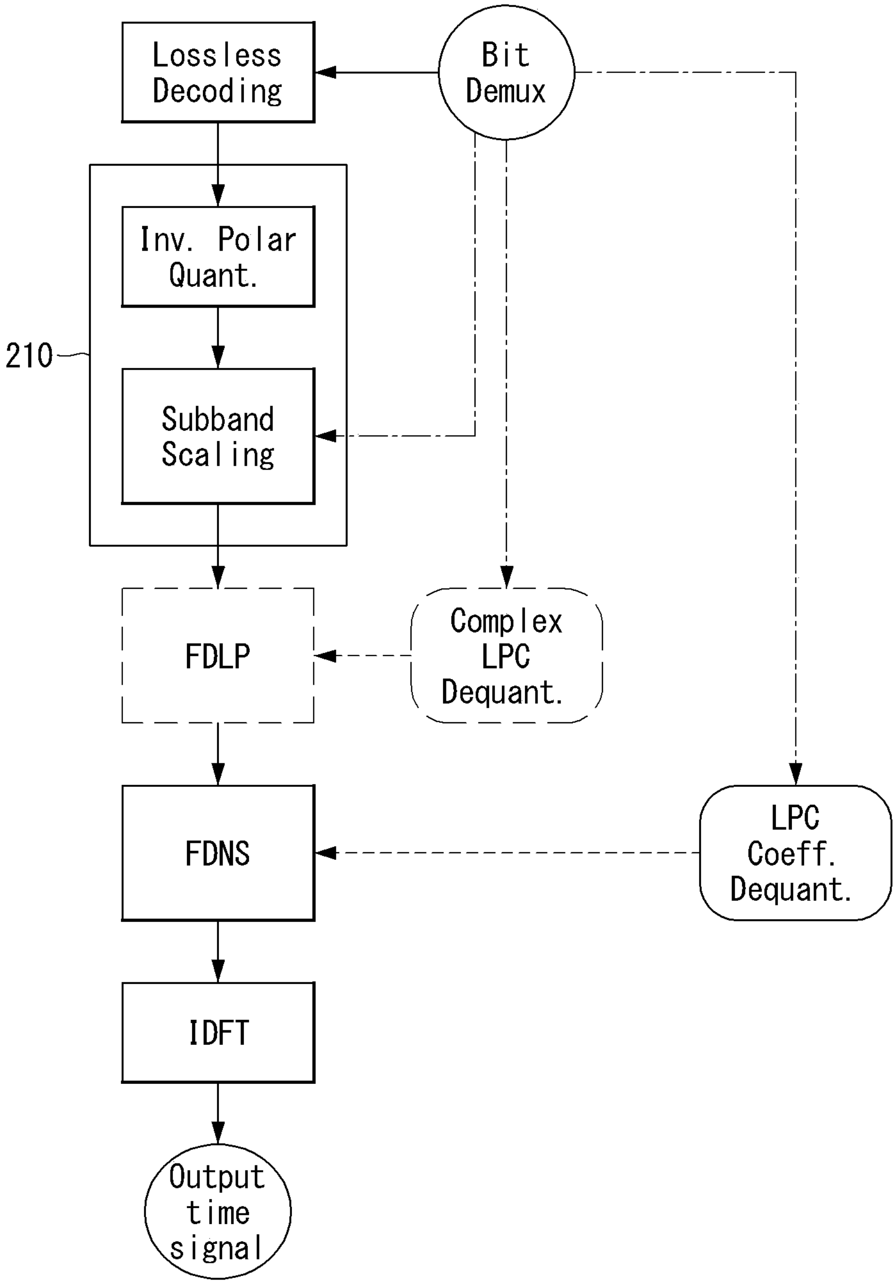
FIG. 7 is a conceptual diagram illustrating an audio signal decoder based on complex number quantization according to an embodiment of the present disclosure.

FIG. 7 is a conceptual diagram illustrating an audio signal decoder based on complex number quantization according to an embodiment of the present disclosure.

FIGS. 6 and 7 may be implemented in the form of an audio signal encoder/decoder using dedicated hardware for audio signal processing, or it may correspond to an audio signal encoding/decoding method executed by a processor based on at least one executable instruction within a computing system. For example, each of the elements in FIGS. 6 and 7 may correspond to hardware components of the audio signal encoder/decoder or be understood by those skilled in the art as corresponding to each step of the audio signal encoding/decoding method.

In an embodiment of FIGS. 6 and 7, a linear predictive coding (LPC) analysis module, an LPC coefficient quantizer, a Frequency Domain Noise Shaping (FDNS) module, a corresponding LPC coefficient inverse quantizer, and a corresponding FDNS decoder are added to the embodiment in FIGS. 1 and 2.

In this case, a complex LPC analysis module, a complex LPC coefficient quantizer, a Frequency Domain Linear Prediction (FDLP) encoder, a corresponding complex LPC coefficient inverse quantizer, and an FDLP decoder may optionally be added to this setup.

The encoder and decoder according to the embodiment of FIGS. 6 and 7 also includes a subband scaler, a polar quantizer 110, and/or a polar inverse quantizer 210.

The encoder depicted in FIG. 6 receives a time-domain audio signal, performs DFT and simultaneously linear prediction (LP) on the received signal to calculate and quantize LPC coefficients. Here, the order of the LP and perceptual weighting parameters may be set to commonly used values.

Typically, LPC coefficients quantization is typically performed on the line spectral pairs (LSP) or immittance spectral pairs (ISP) representing the LPC coefficients, and the quantized information is converted into a bitstream and transmitted to the FDNS module. The FDNS module uses the quantized LPC coefficients to predict the envelope in the frequency domain and subtracts the predicted envelope from the magnitude values of the DFT coefficients to calculate the LP residual signal in the frequency domain.

Optionally, the calculated frequency domain LP residual signal may be applied to the LP to calculate complex LPC coefficients. Here, the order and parameters commonly used in LP may be employed. In the case of the complex LPC coefficients, similar to LSP, it is possible to construct a polynomial in the z-transform domain using complex LPC coefficients, find complex roots, quantize the real and imaginary parts separately, and then convert the quantized values into a bitstream.

For quantization, the scalar quantization or vector quantization may be opted for use depending on the user's choice. Afterward, a finite impulse response (FIR) filter is designed with the quantized complex LPC coefficients as coefficients. The DFT coefficients output from the FDNS module is substituted into the FIR filter designed with the complex LPC coefficients to compute the FDLP residual signal.

The residual signal acquired by shaping the frequency band signal, which is obtained through DFT, using the FDNS module and FDLP encoder is processed through the subband scaler, polar quantizer, and lossless coding module, similar to the embodiment of FIG. 1, to compute the final bitstream.

The decoder depicted in FIG. 7, similar to the embodiment of FIG. 2, receives the bitstream as input into the lossless decoding module and processes the signal sequentially through the inverse polar quantizer and subband scaler. The inverse scaled DFT coefficients for each subband, output from the subband scaler, may be filtered with the inverse quantized complex LPC coefficients in the reverse process of the FDLP in FIG. 6. The restored complex coefficients obtained through the reverse process of the FDLP are filtered with the inverse quantized LPC coefficients in the reverse process of FDNS in FIG. 6. The restored complex coefficients obtained through the reverse process of FDNS are multiplied by the window function corresponding to the window function used in the second encoder (FIG. 6) and subjected to IDFT and sequentially the overlap-and-add process to recover the time domain signal. When the encoder used the MCLT in FIG. 6, the corresponding Inverse MCLT may be applied to obtain a fully restored signal, similar to the case with the IDFT.

Figure 8:
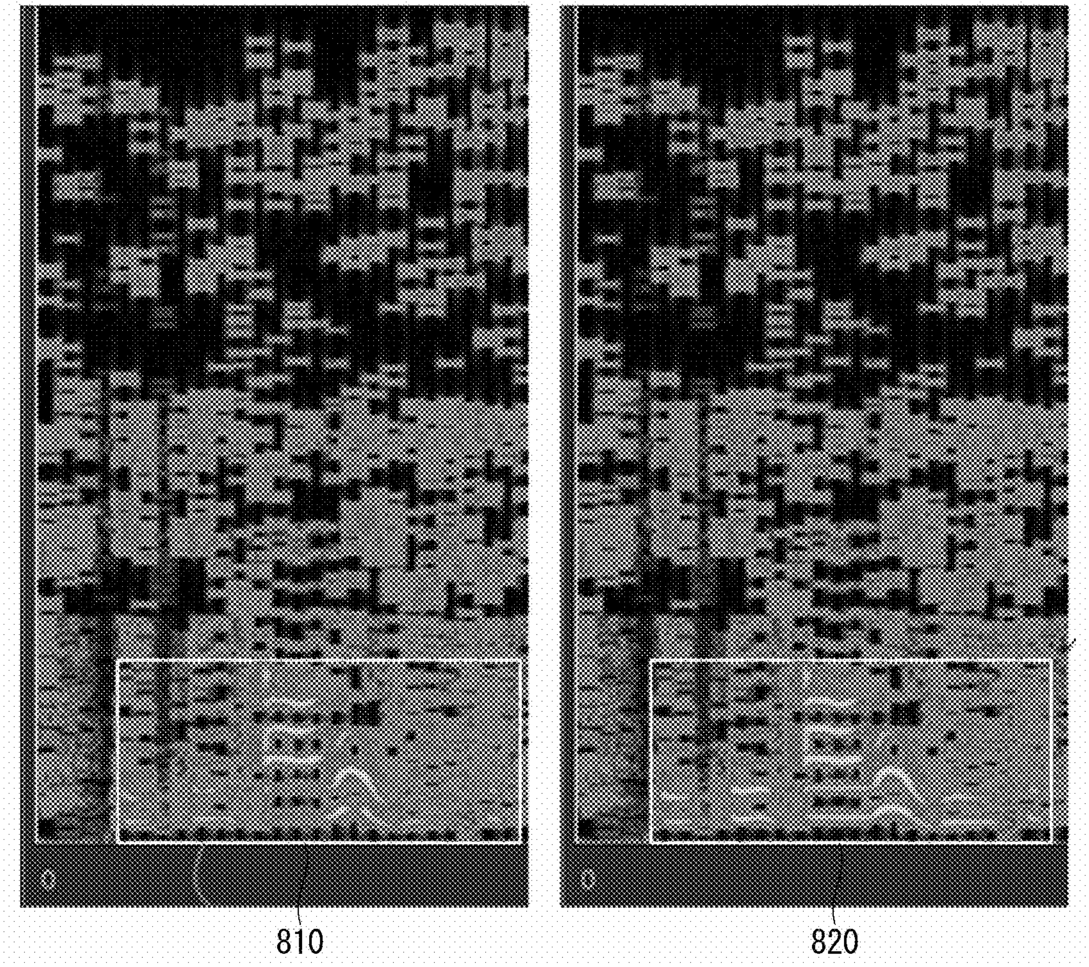
FIG. 8 is a diagram illustrating spectrograms of audio applied with an audio signal encoding/decoding technique based on complex number quantization according to an embodiment of the present disclosure.

FIG. 8 is a diagram illustrating spectrograms of audio applied with an audio signal encoding/decoding technique based on complex number quantization according to an embodiment of the present disclosure.

FIG. 8 illustrates the effectiveness of the polar quantization method of the present disclosure by showing differences in example spectra. FIG. 8 shows the results of implementations according to the embodiments of FIGS. 1 to 4. First, with reference to the left graph 810 for the case of using polar quantization for only Mode 2, it can be observed that the representation of the components with large sound pressure in the low frequencies of the speech spectrogram is blurred, which is expressed as unclear speech.

The right graph 820 in FIG. 8 depicts the spectrogram of audio encoded and decoded using polar quantization for Mode 1 and Mode 2 in the audio encoding/decoding technique according to an embodiment of the present disclosure, as illustrated in FIGS. 1 to 4. When compared to graph 810, it can be observed in graph 820 that using both quantization modes reproduces the components with large sound pressure in the low-frequency range of the speech signal more clearly. This demonstrates the effectiveness of the dual-mode polar quantizer of the present disclosure.

Figures 9, 10:
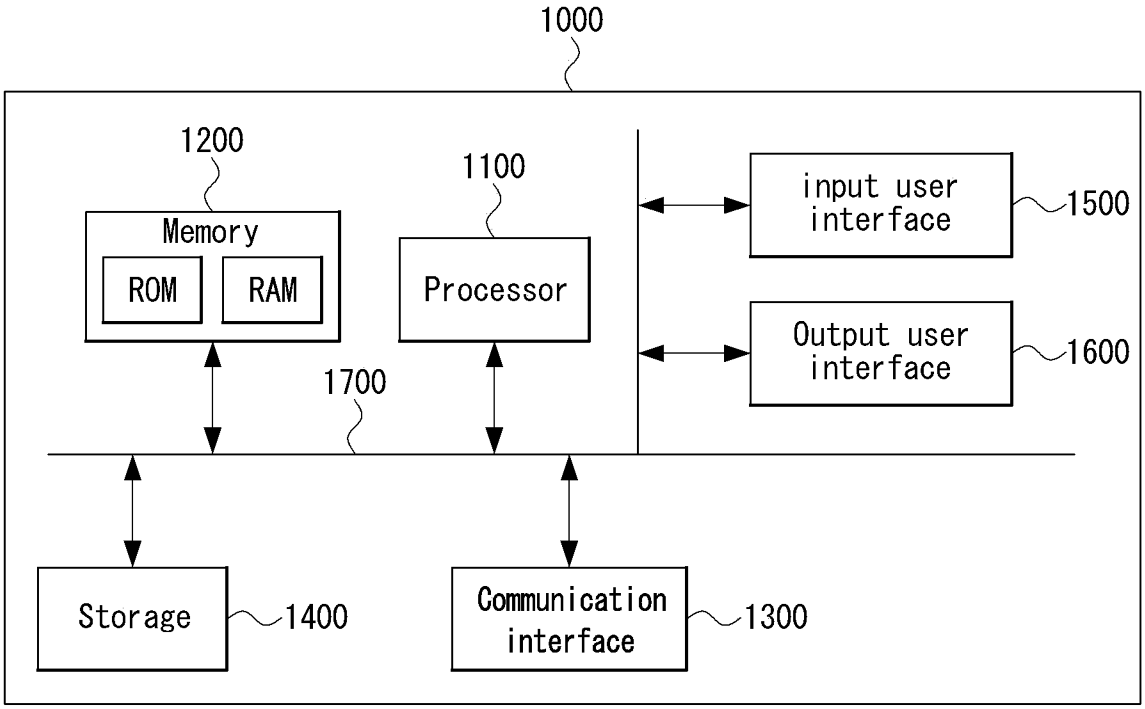
FIG. 9 is a table illustrating performance metrics for various embodiments of the present disclosure and conventional techniques.
FIG. 10 is a conceptual diagram illustrating a generalized audio signal encoding/decoding apparatus or computer system capable of performing at least part of the processes of FIGS. 1 to 9.

FIG. 9 is a table illustrating performance metrics for various embodiments of the present disclosure and conventional techniques.

FIG. 9 shows the segmental SNR differences for various embodiments (b) to (e) of the present disclosure along with the conventional MDCT-based TCX coding (a). FIG. 9 represents the results of implementations in the embodiments of FIGS. 1, 2, 3, and 4. All coding techniques illustrated in FIG. 9 were conducted at a bit rate of 13 kbps.

First, the embodiment (e) of the present disclosure is superior in the segmental SNR to the technique of quantizing real coefficients based on MDCT (a). This is a meaningful difference, even though the fact that segmental SNR as an objective indicator is not highly correlated with subjective sound quality. Furthermore, the fact that, within the same structure, the embodiment (e) is superior, in the objective metrics, to the embodiment (b) separately quantizing complex coefficients for real and imaginary parts demonstrates the utility of polar quantization in quantizing complex numbers as proposed.

An audio signal encoding and decoding technique according to an embodiment of the present disclosure is advantageous in terms of effectively applying different quantization or inverse quantization methods depending on whether the magnitude of the scaled complex coefficients is greater or smaller than a predetermined threshold value. The audio signal encoding and decoding technique is capable of being performed in such a way as to apply the existing scalar quantization technique for outliers where the magnitude of the scaled complex coefficients is larger than the threshold value, and an optimized polar quantization (PQ) technique for cases where the magnitude of the complex coefficients is smaller than the threshold value.

FIG. 10 is a conceptual diagram illustrating a generalized audio signal encoding/decoding apparatus or computer system capable of performing at least part of the processes of FIGS. 1 to 9.

At least part of the processes of audio signal encoding and/or decoding, quantization, or inverse quantization methods according to an embodiment of the present disclosure is executable by the computing system 1000 of FIG. 10.

With reference to FIG. 10, the computing system 1000 according to an embodiment of the present disclosure may include a processor 1100, a memory 1200, a communication interface 1300, a storage device 1400, an input interface 1500, an output 1600, and a bus 1700.

The computing system 1000 according to an embodiment of the present disclosure may include at least one processor 1100 and a memory 1200 storing instructions for instructing the at least one processor 1100 to perform at least one step. At least some steps of the method according to an embodiment of the present disclosure may be performed by the at least one processor 1100 loading and executing instructions from the memory 1200.

The processor 1100 may refer to a central processing unit (CPU), a graphics processing unit (GPU), or a dedicated processor on which the methods according to embodiments of the present disclosure are performed.

Each of the memory 1200 and the storage device 1400 may be configured as at least one of a volatile storage medium and a non-volatile storage medium. For example, the memory 1200 may be configured as at least one of read-only memory (ROM) and random-access memory (RAM).

Also, the computing system 1000 may include a communication interface 1300 for performing communication through a wireless network.

In addition, the computing system 1000 may further include a storage device 1400, an input interface 1500, an output interface 1600, and the like.

In addition, the components included in the computing system 1000 may each be connected to a bus 1700 to communicate with each other.

The computing system of the present disclosure may be implemented as a communicable desktop computer, a laptop computer, a notebook, a smart phone, a tablet personal computer (PC), a mobile phone, a smart watch, a smart glass, an e-book reader, a portable multimedia player (PMP), a portable game console, a navigation device, a digital camera, a digital multimedia broadcasting (DMB) player, a digital audio recorder, a digital audio player, digital video recorder, digital video player, a personal digital assistant (PDA), etc.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

According to an embodiment of the present disclosure, it is advantageous to improve coding efficiency in the encoding and decoding of audio signals by polar quantizing (PQ) complex coefficients on a per-subband basis.

According to an embodiment of the present disclosure, it is advantageous to improve the degree of freedom for analysis and synthesis windows by using DFT instead of MDCT to allow for the designing and use of windows that do not satisfy the restriction of the conventional Time-Domain Aliasing Cancellation (TDAC).

According to an embodiment of the present disclosure, it is advantageous to fundamentally avoid time-domain aliasing distortion occurring when integrated with existing audio coding tools such as Temporal Noise Shaping (TNS).

According to embodiments of the present disclosure, it is advantageous, compared to quantizing the real and imaginary parts individually, that polar quantization is capable of diversifying the subband-specific bit allocation for phase without the need for additional bits by using quantized/inverse-quantized magnitude information from the previous stages in the phase quantization/inverse quantization process, as well as increasing coding efficiency.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A complex number quantization-based audio signal encoding method comprising:

estimating a scale factor for each subband of an input audio signal;

performing complex magnitude scaling for each subband based on the scale factor; and performing polar quantization on a complex frequency coefficient for each subband, wherein the performing the polar quantization for each subband comprises applying two or more different magnitude quantization techniques based on the magnitude of the complex frequency coefficient scaled for each subband.

2. The method of claim 1, wherein the performing the polar quantization for each subband comprises:

determining a magnitude quantization mode by comparing the magnitude of the complex frequency coefficient scaled for each subband with a threshold value;

applying a magnitude quantization technique for a first mode based on the magnitude quantization mode being the first mode; and applying a magnitude quantization technique for a second mode based on the magnitude quantization mode being the second mode.

3. The method of claim 2, wherein the determining of the magnitude quantization mode comprises determining the magnitude quantization mode for each subband by comparing the magnitude of the complex frequency coefficient scaled for each subband with a subband-specific threshold value determined based on a bit constraint configured for each subband.

4. The method of claim 1, wherein the performing the polar quantization for each subband comprises:

applying one of the two or more different magnitude quantization techniques based on the magnitude of the complex frequency coefficient scaled for each subband; and performing phase quantization on the complex frequency coefficient scaled for each subband.

5. The method of claim 1, wherein the performing the polar quantization for each subband comprises performing magnitude quantization and phase quantization on the complex frequency coefficient scaled for each subband based on a bit constraint configured for each subband.

6. The method of claim 1, wherein the performing the polar quantization for each subband comprises performing phase quantization on the complex frequency coefficient scaled for each subband using intervals of a number corresponding to a power of 2.

7. The method of claim 1, further comprising transmitting, after the performing the polar quantization for each subband, a polar quantization index obtained for each subband as input to a lossless coding process.

8. The method of claim 1, further comprising converting, before the performing of the complex magnitude scaling for each subband, the input audio signal into the frequency domain, wherein the converting the input audio signal into the frequency domain is applied with discrete Fourier transform (DFT) or modulated complex lapped transform (MCLT).

9. A complex number quantization-based audio signal decoding method comprising:

determining one of two or more different magnitude inverse quantization modes by comparing a decoded magnitude quantization index for an audio signal with a threshold value;

performing magnitude inverse polar quantization on the magnitude quantization index based on the determined magnitude inverse quantization mode;

performing phase inverse polar quantization on a decoded phase quantization index for the audio signal; and generating an inverse polar quantized complex coefficient for the audio signal by combining the magnitude inverse polar quantization result and the phase inverse polar quantization result.

10. The method of claim 9, further comprising inverse-scaling the inverse polar quantized complex coefficient for each subband, wherein the inverse-scaling for each subband is performed using a subband-specific scaling factor generated during an encoding process.

11. The method of claim 9, further comprising inversely transforming the inverse polar quantized complex coefficient for the audio signal into a time domain audio signal by applying an inverse transformation technique corresponding to a frequency domain transformation technique executed during an encoding process.

12. The method of claim 9, wherein the determining of one of the magnitude inverse quantization modes comprises determining a first mode applying a scalar inverse quantization technique as the magnitude inverse quantization mode based on the magnitude quantization index being equal to or greater than the threshold value.

13. The method of claim 1, wherein the determining one of the magnitude inverse quantization modes comprises determining a second mode for inverse polar quantization of the magnitude quantization index based on a function of a quantization cell size boundary value as the magnitude inverse quantization mode based on the magnitude quantization index being less than the threshold value.

14. The method of claim 9, further comprising generating, before the determining of one of the magnitude inverse quantization mode, the decoded magnitude quantization index and the decoded phase quantization index through lossless decoding.

15. A complex number quantization-based audio signal decoding apparatus comprising:

an inverse polar quantizer performing inverse polar quantization on an audio signal, wherein the inverse polar quantizer is configured to:

determine one of two or more different magnitude inverse quantization modes by comparing a decoded magnitude quantization index for the audio signal;

perform magnitude inverse polar quantization on the magnitude quantization index based on the determined magnitude inverse quantization mode;

perform phase inverse polar quantization on a decoded phase quantization index for the audio signal; and generate an inverse quantized complex coefficient for the audio signal by combining the magnitude inverse polar quantization result and the phase inverse polar quantization result.

16. The apparatus of claim 15, further comprising a subband inverse scaling module performing inverse scaling on the inverse polar quantized complex coefficient for each subband, wherein the subband inverse scaling module performs inverse scaling on the inverse polar quantized complex coefficient for each subband using a subband-specific scale factor generated during an encoding process.

17. The apparatus of claim 15, further comprising an inverse transformer performing inverse transformation of the inverse polar quantized complex coefficient for the audio signal into a time domain audio signal by applying an inverse transformation technique corresponding to a frequency domain transformation technique executed during an encoding process.

18. The apparatus of claim 15, wherein the inverse polar quantizer determines a first mode applying a scalar inverse quantization technique as the magnitude inverse quantization mode based on the magnitude quantization index being equal to or greater than the threshold value.

19. The apparatus of claim 15, wherein the inverse polar quantizer determines a second mode for inverse polar quantization of the magnitude quantization index based on a function of a quantization cell size boundary value as the magnitude inverse quantization mode based on the magnitude quantization index being less than the threshold value.

20. The apparatus of claim 15, further comprising a lossless decoder generating the decoded magnitude quantization index and the decoded phase quantization index.

* * * * *